(12) United States Patent
Schütz

(10) Patent No.: US 7,655,177 B2
(45) Date of Patent: *Feb. 2, 2010

(54) METHOD FOR MANUFACTURING WIDE MOUTH BARRELS OF THERMOPLASTIC MATERIALS

(75) Inventor: Udo Schütz, Selters/Westerwald (DE)

(73) Assignee: Schütz GmbH & Co. KGaA, Selters/Westerwald (DE)

( * ) Notice: Subject to any disclaimer, the term of this patent is extended or adjusted under 35 U.S.C. 154(b) by 851 days.

This patent is subject to a terminal disclaimer.

(21) Appl. No.: 11/077,180

(22) Filed: Mar. 10, 2005

(65) Prior Publication Data

US 2005/0200053 A1   Sep. 15, 2005

(30) Foreign Application Priority Data

Mar. 11, 2004 (DE) ........................ 10 2004 011 915
Jan. 13, 2005 (DE) ........................ 10 2005 001 649
Jan. 31, 2005 (DE) ........................ 10 2005 004 548

(51) Int. Cl.
*B29C 49/04* (2006.01)
*B29C 49/22* (2006.01)

(52) U.S. Cl. .................... 264/515; 264/163; 264/540

(58) Field of Classification Search .............. 264/515, 264/540, 159, 163; 425/535, 536
See application file for complete search history.

(56) References Cited

U.S. PATENT DOCUMENTS

| | | | | |
|---|---|---|---|---|
| 2,579,399 A * | 12/1951 | Ruckberg | ................... | 425/536 |
| 3,198,375 A * | 8/1965 | Hunter | ................... | 222/566 |
| 3,632,717 A * | 1/1972 | Showalter et al. | .......... | 264/152 |
| 4,091,059 A * | 5/1978 | Ryder | .......................... | 264/28 |
| 4,500,010 A * | 2/1985 | Schutz | ....................... | 220/320 |
| 4,667,384 A * | 5/1987 | Miller | ......................... | 29/509 |
| 5,213,753 A * | 5/1993 | Przytulla | .................... | 264/534 |
| 5,571,474 A * | 11/1996 | Przytulla | .................... | 264/534 |
| 5,964,367 A * | 10/1999 | Przytulla | .................... | 220/319 |
| 7,180,721 B2 * | 2/2007 | Schutz | ....................... | 361/212 |
| 2004/0079754 A1* | 4/2004 | Schutz | ................... | 220/62.22 |
| 2004/0089659 A1* | 5/2004 | Schutz | ....................... | 220/9.1 |

FOREIGN PATENT DOCUMENTS

EP    0 781 234    4/1999

* cited by examiner

*Primary Examiner*—Robert B Davis
(74) *Attorney, Agent, or Firm*—Friedrich Kueffner (57) ABSTRACT

A wide mouth plastic barrel with a removable lid and a clamping ring closure is manufactured by extruding a plastic tube into a blow mold and by producing a closed preform. The preform is finish-blown to a barrel body, wherein the blowing air for finish-blowing a barrel body with a closed lid is introduced through a blow nozzle inserted into an intermediate ring of the barrel body and the blowing air for finish-blowing a barrel body with a bung lid is introduced through a bung hole by a blow nozzle and optionally through a blow nozzle in the intermediate ring. After removal from the blow mold, the lid is separated from the barrel body by cutting out the intermediate ring. A seal is inserted into the barrel lid, and the barrel lid is fastened by the clamping ring on a projection of the basic barrel member.

8 Claims, 7 Drawing Sheets

METHOD FOR MANUFACTURING WIDE MOUTH BARRELS OF THERMOPLASTIC MATERIALS

BACKGROUND OF THE INVENTION

1. Field of the Invention

The invention relates to a method for manufacturing wide mouth barrels having a removable lid from thermoplastic material.

2. Description of the Related Art

For manufacturing wide mouth barrels of thermoplastic material having a removable lid and a clamping ring as closure means as disclosed in EP 0 781 234 B1, an extrusion blowmolding method is used wherein in the first method step a plastic tube is extruded from a tube-forming extrusion die head and in a second method step the tube is pre-blown to a preform in a two-part blow mold; the preform is subsequently finish-blown to a closed barrel body that solidifies by contact with the cooled shaping walls of the blow mold. Subsequently, for producing the barrel opening, the top wall of the barrel body is cut out of the barrel body by a cutting tool that performs a cut concentrical to the longitudinal axis of the barrel body. The closure lids of the wide mouth barrels are produced by an injection molding device. The manufacture of the wide mouth lid barrels requires a blow molding device and an injection molding device; this requires high installation costs.

SUMMARY OF THE INVENTION

It is an object of the present invention to provide a method, based on the aforementioned extrusion blowmolding method, for manufacturing wide mouth barrels which method eliminates injection molding of the lids by an injection molding device. Moreover, the new method is to be developed further with regard to manufacturing electrically grounded wide mouth barrels of thermoplastic material.

In accordance with the present invention, this is achieved in connection with a method of the aforementioned kind, wherein a single-layer or multi-layer plastic tube is extruded into a blow mold and is blown to a barrel body, in that a barrel body is blowmolded that has a basic barrel member, a bottom with or without support ring, a projection on the basic barrel member for attaching a lid by means of a clamping ring closure, wherein the projection is formed on the basic barrel member at the level of the barrel opening rim or at a spacing below the barrel opening rim of the wide mouth barrel to be produced, a closed lid or a bung lid, as well as an intermediate ring between the projection and the barrel lid or the barrel opening rim and the barrel lid, wherein the blowing air for finish-blowing a closed preform to a barrel body having a closed lid is introduced through at least one injection blow nozzle inserted into the intermediate ring and the blowing air for finish-blowing a closed preform to a barrel body with a bung lid is introduced through the bung hole of at least one bung of the bung lid by means of a blow nozzle and/or through at least one blow nozzle introduced into the intermediate ring, and wherein, after cooling of the barrel body in the blow mold and removal of the barrel body from the blow mold, the basic barrel member and the lid are separated from one another by cutting out the intermediate ring from the barrel body and, after insertion of a sealing ring into a sealing seat of the lid, the lid is fastened by means of a clamping ring on the projection of the basic barrel member.

This object is further solved by coextruding a multi-layer tube of a non-conducting basic material with at least one section arranged on the circumference, in particular a contact strip of an electrically conducting plastic material, as well as pre-blowing of the tube to a pre-from and finish-blowing of the pre-from to an electrically grounded barrel body with at least one electrically conducting contact strip integrated into the barrel lid, the intermediate ring, the basic barrel member, and the barrel bottom, wherein the contact strip provides an electrical connection between the inner surface and the outer surface of the barrel body and has a thickness that matches the wall thickness of the barrel body.

The dependent claims define further advantageous modifications.

The method according to the invention for manufacturing wide mouth barrels of thermoplastic material is based on the extrusion blowmolding method disclosed in EP 0 781 234 B1 for manufacturing wide mouth barrels; however, the method according to the invention eliminates the need for injection molding the barrel lid by means of an injection molding device and enables the manufacture of wide mouth plastic barrels with a comprehensive electrical grounding with which the electrical charges that occur within the liquid material contained in the barrels and on the inner surface of the barrels and the electrical charges that are generated by friction on the outer surface of the barrel are discharged into the ground by means of the electrically conducting contact strips, integrated in the barrel body, the bottom, and the lid of the barrels, and by means of the conducting or permanent antistatic outer layer of the barrels. The electrical grounding of the outer surface of the barrels and of the interior of the barrels as well as of the liquids transported or stored therein and the bulk materials transported and stored therein enables the use of the barrels manufactured according to the present invention as containers for hazardous materials for combustible liquids, emulsions, solvents, paints, and enamel paints, having a flash point of <$61°$ C. as well as for easily inflammable bulk materials and the use of the barrels in work areas in which an explosive atmosphere can be generated by gases, vapors or mist.

DESCRIPTION OF THE PREFERRED EMBODIMENTS

When employing extrusion blowmolding for manufacturing wide mouth barrels of a thermoplastic material, in the first method step a multi-layer plastic tube of a non-conducting basic material is extruded through the extrusion die head of a blow molding device; the tube is in particular a three-layer tube comprised of an inner layer, a central layer, a conducting or permanently antistatic outer layer as well as at least one contact strip that is arranged on the circumference and is comprised of an electrically conducting plastic material. The extruded multi-layer plastic tube, after closing the upper tube end by means of a closure tool, is pre-blown by blowing air that is introduced through a blow nozzle inserted into the lower end of the tube.

There is also the possibility of pre-blowing the extruded tube to a preform by closing the lower tube end by means of blowing air that is supplied through a nozzle arranged in the extrusion die head.

Figure 1:
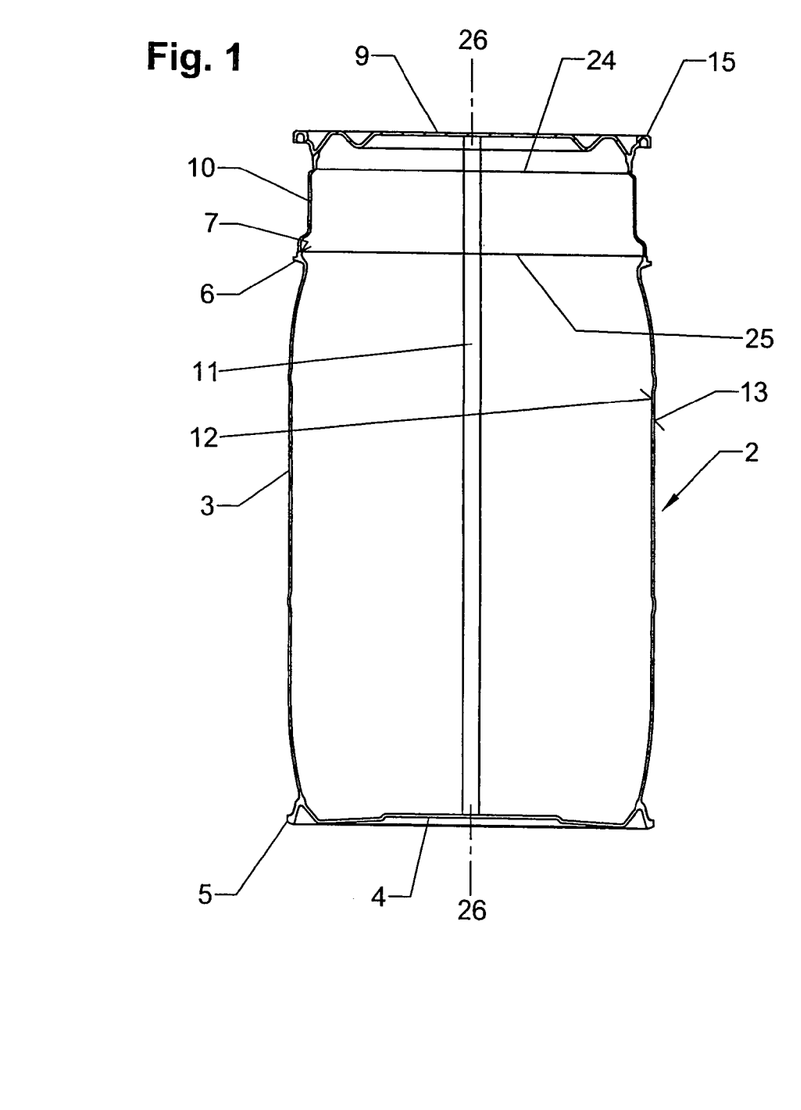
FIG. 1 shows a longitudinal section of a barrel body with support ring and closed lid that has been removed from a blow molding device after blowmolding and cooling.

Subsequently, after squeezing the lower end of the prefrom by means of a closure unit and closing the two mold halves of the divided blow mold 1 (illustrated in FIGS. 7a and 7b), in the second method step the preform is then blown to a barrel body 2 illustrated in FIG. 1 that comprises a basic barrel member 3, a bottom 4 with a support ring 5, a projection 6 on the basic barrel member 3 at the level of the barrel opening rim 7 of the wide mouth barrel 8 to be produced, a closed lid 9, an intermediate ring 10 between the projection 6 and the barrel lid 9, as well as an electrical contact strip 11 integrated into the lid 9, the intermediate ring 10, the basic barrel member 3, and the bottom 4 of the barrel 4. The electrically conducting contact strip 10 provides an electrical connection between the inner surface 12 and the outer surface 13 of the barrel body 2 and has a thickness that matches the wall thickness of the barrel body 2. The blowing air is supplied through one or several blow nozzles 14 that is/are inserted into a section of the preform that is blowmolded to the intermediate ring 10 of the barrel body 2.

Upon coextrusion of the multi-layer plastic tube into the blow mold, the material tube that exits from the extrusion die head continuously or discontinuously is split at least at one location of its circumference and into the resulting gap an electrically conducting plastic material is injected for forming a contact strip that fuses homogeneously with the preform.

Figure 7A:
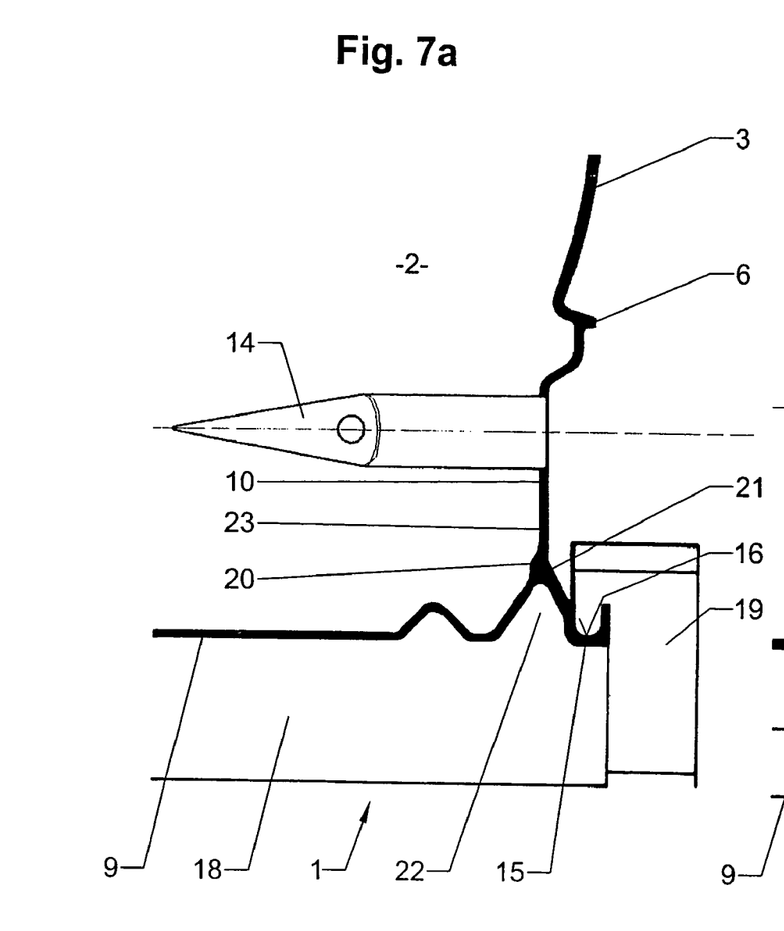
FIGS. 7a and 7b show schematically in a detail view a closed and an open blow mold, respectively, with a blow-molded barrel body.

In the barrel embodiment according to FIGS. 1 through 4, the barrel body 2 is blowmolded with a closed lid 9 that has a downwardly open U-shaped outer rim 15 with a sealing seat 16 for receiving a lid seal or gasket 17. Upon finish-blowing the barrel body 2 in the blow mold 1 the lid rim 15 and the sealing seat 16 are pressed by two oppositely moving mold slides 18, 19 (FIG. 7a). By pressing the lid rim, a shape-stable (dimensionally stable) lid with a proper sealing seat without any disruptive bead in the area of the mold division plane is blowmolded that does not require any post processing.

Upon finish-blowing a barrel body 2 in the blow mold 1, a circumferential reinforcement bead 20 for reinforcing the barrel lid is formed on the transition section 21 between an engagement groove 22 adjoining the outer rim 15 of the lid 4 and provided for a barrel gripping or lifting device and an annular stay 23 formed below the engagement groove 22.

Figure 7B:
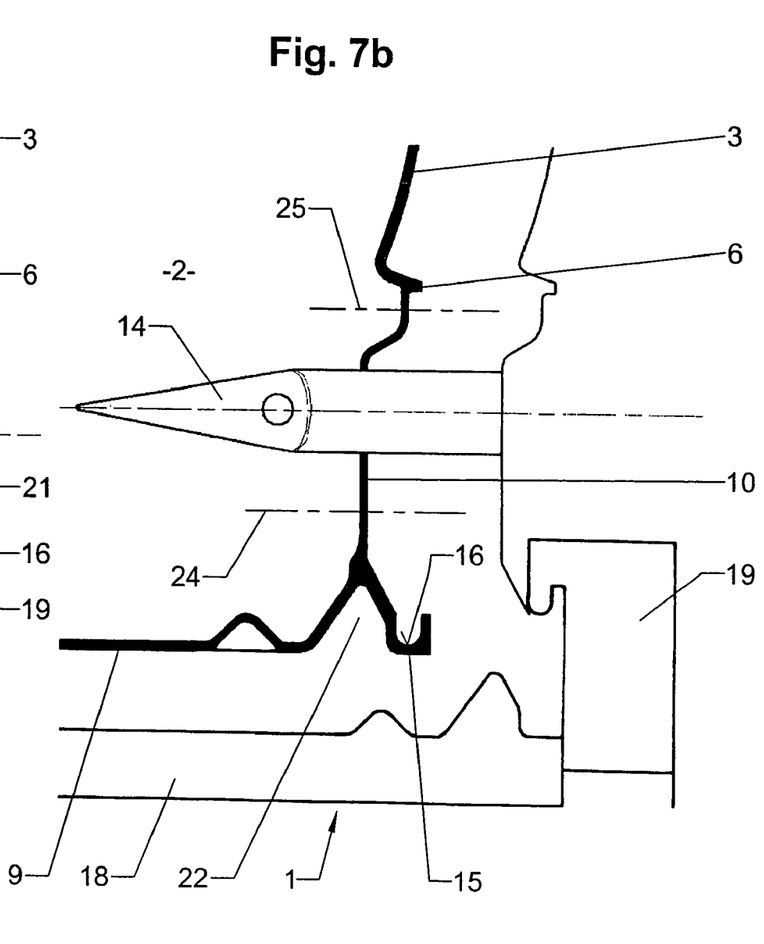

After cooling the barrel body 2 with the closed lid 9 whose U-shaped outer rim 15 is cooled by the mold slides 18, 19 from the interior and exterior, the blow mold 1 is opened and the barrel body 2 is removed from the blow mold (FIG. 7b).

Figure 2:
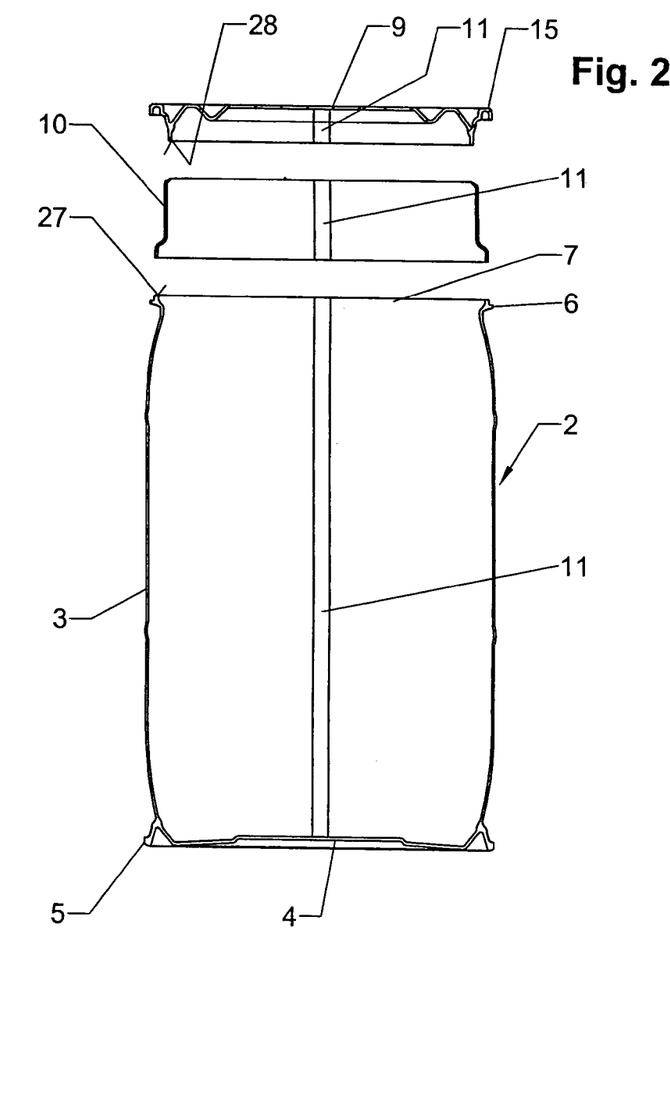
FIG. 2 shows a longitudinal illustration of the basic barrel member and the barrel lid after having cut the intermediate ring, required for introducing the injection blow nozzle for the blowmolding process, from the barrel body according to FIG. 1.

Subsequently, in accordance with FIGS. 1, 2 and 7b, the intermediate ring 10 is cut out from the barrel body 2 along the designated separating lines 24, 25 by two cuts guided perpendicularly to the longitudinal axis 26-26 of the barrel body 2, and the edges of cut 27, 28 of the basic barrel member 3 and of the lid 3 are exposed to hot air for removing the burrs of the cut.

Subsequently, the basic barrel member 3 and the lid 9 pass through a cooling stretch.

Figure 3:
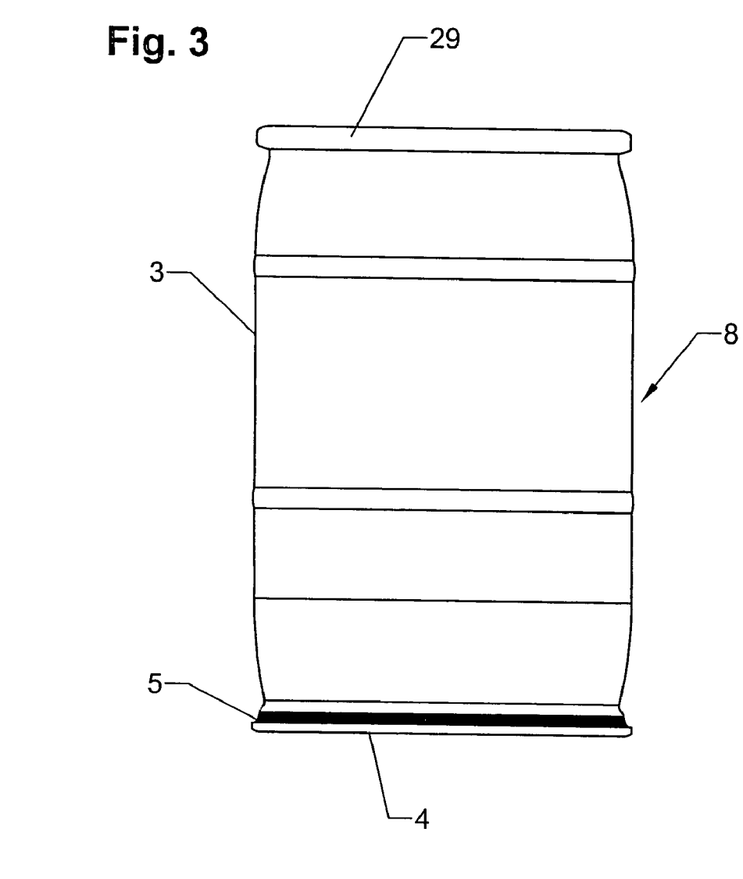
FIG. 3 is a side view of the assembled wide mouth barrel with support ring and closed lid.
Figure 4:
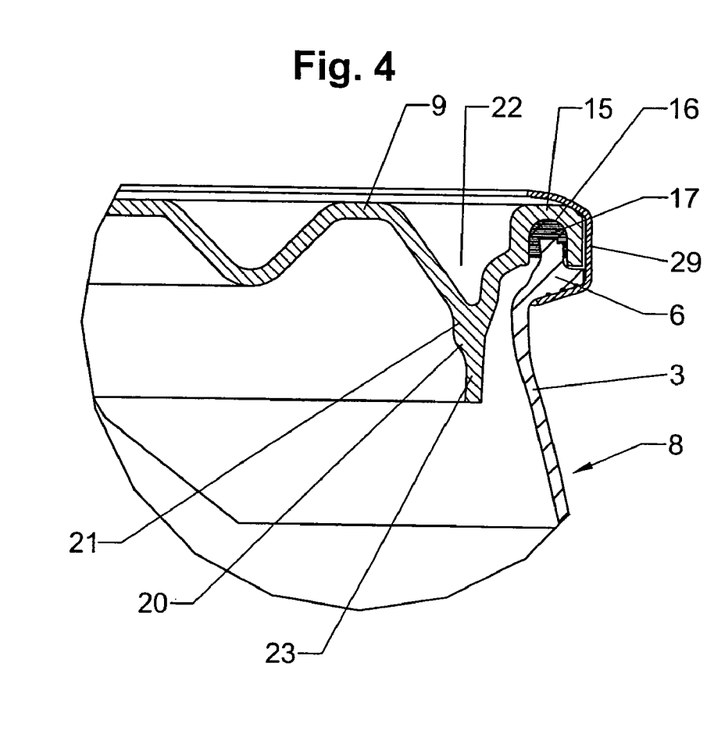
FIG. 4 is a detail illustration of the lid area of the wide mouth barrel according to FIG. 3.

At this point, a seal (sealing ring or gasket) 17 is inserted into the sealing seat 16 of the lid 9 and, subsequently, during final assembly of the wide mouth barrel 8, the lid 9 is attached by means of a clamping ring 29 on the projection 6 of the basic barrel member 3 (FIGS. 3 and 4).

Figure 5:
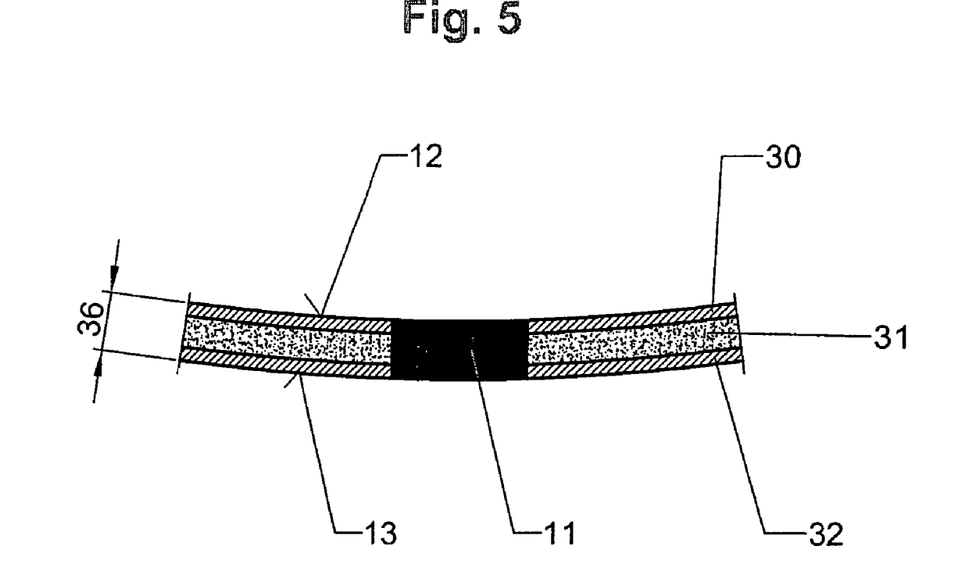
FIG. 5 shows a detail cross-section of the barrel wall of the wide mouth barrel according to FIG. 3 having a three-layer configuration.

FIG. 5 shows a three-layer configuration of basic barrel member 3, bottom 4, and lid 9 of the wide mouth barrel 8 with an inner layer 30, a central layer 31, and a conducting or permanently antistatic outer layer 32 that contains, for example, a proportion of conducting carbon black.

For manufacturing the central layer 31, a recycled granular material or ground material of pure polyethylene and/or polyethylene containing a conducting carbon black proportion is used as a starting material; for the inner and the outer layers 30, 32 a virgin granular polyethylene material is used.

Figure 6:
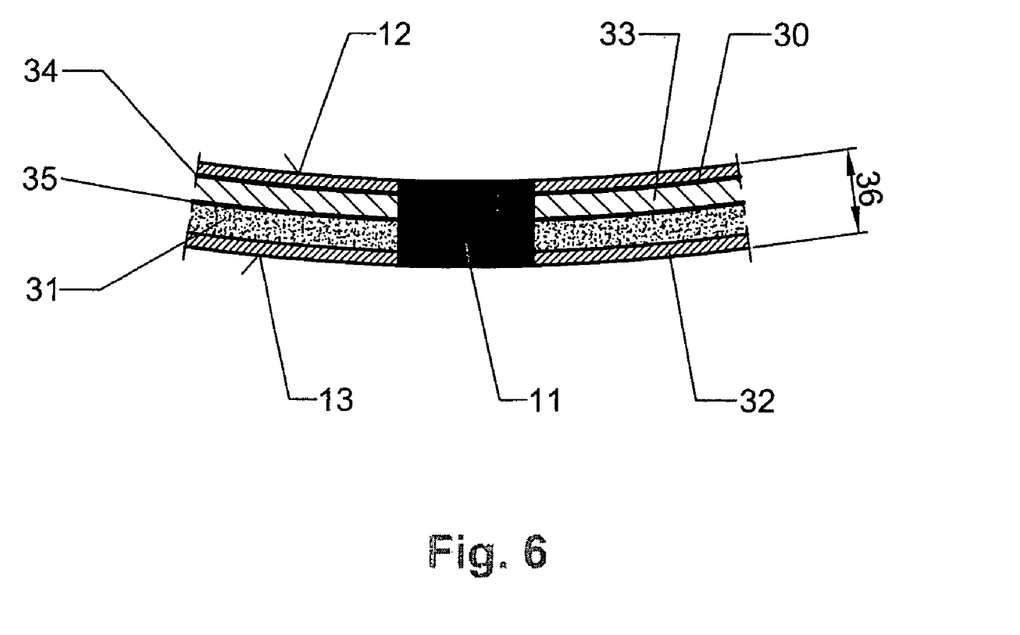
FIG. 6 shows a wall section according to FIG. 5 of a wide mouth barrel having a six-layer configuration.

FIG. 6 shows a six-layer configuration of a wide mouth barrel 8 with an inner layer 30 of pure polyethylene of high-density (HDPE); a barrier layer 33 of polyamide (PA) or an ethylene vinyl acetate copolymer (EVA) that is provided against permeation of oxygen and hydrocarbons and is embedded in two bonding layers 34, 35 of polyethylene of low density (LLDPE); a central layer 31 of recycled granules or ground material of pure polyethylene of high density and/or polyethylene of high density containing a conducting carbon black proportion; and a conducting or permanently antistatic outer layer 32 of polyethylene of high density containing a conducting carbon black proportion.

At least one electrically conducting contact strip 11 of polyethylene of high density with a conducting carbon black proportion is integrated into the basic barrel member 3, the bottom 4, and the lid 9 of the wide mouth barrel 8; the contact strip 11 provides an electrical connection between the inner surface 12 and the outer surface 13 of the wide mouth barrel 8 and has a thickness matching the wall thickness 36 of the barrel. The electrically conducting contact strip 11 extends parallel to the longitudinal axis 26-26 of the barrel across the cylindrical basic barrel member 3 and radially across the bottom 4 and the closed lid 9 of the wide mouth barrel 8.

The wide mouth barrel 8 is electrically grounded by means of the electrically conducting contact strip 11 and the conducting or permanently antistatic outer layer 32 so that electrical charges that occur at the inner surface 12 of the barrel 8 and in the filled-in liquid material or in the bulk material as well as on the outer surface 13 of the barrel are discharged or dissipated into the ground.

Figure 10:
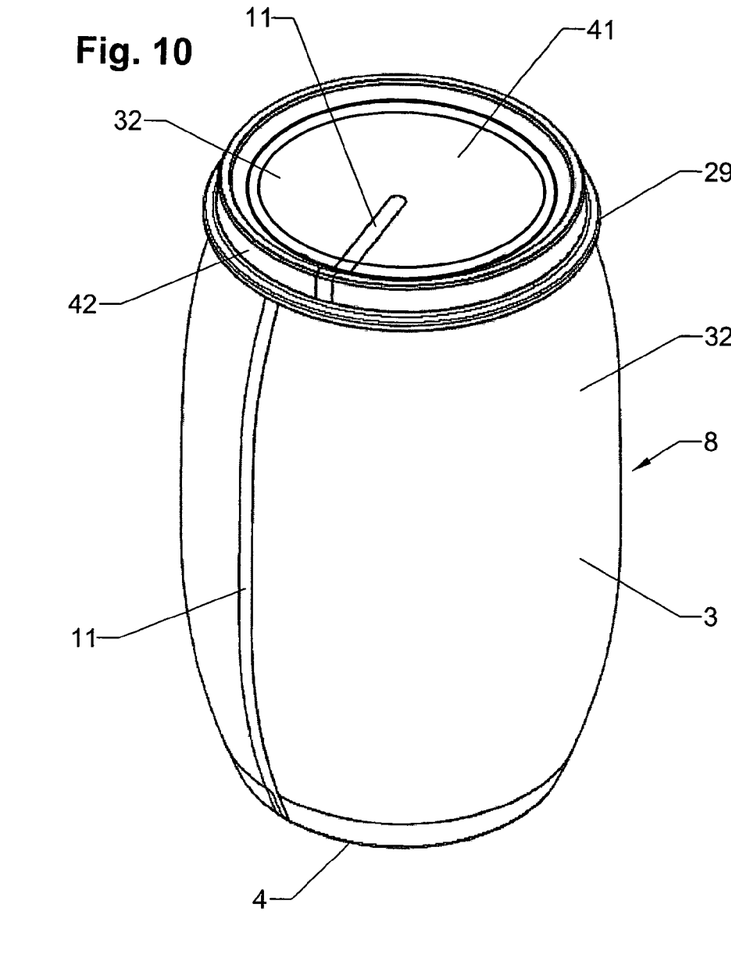
FIG. 10 is a perspective illustration of an assembled wide mouth barrel in a further embodiment with a closed lid.

According to the disclosed method it is also possible to produce a wide mouth barrel 8 without a support ring that is provided instead with a rounded transition between the basic barrel member 3 and the barrel bottom 4 (FIG. 10).

Figure 8:
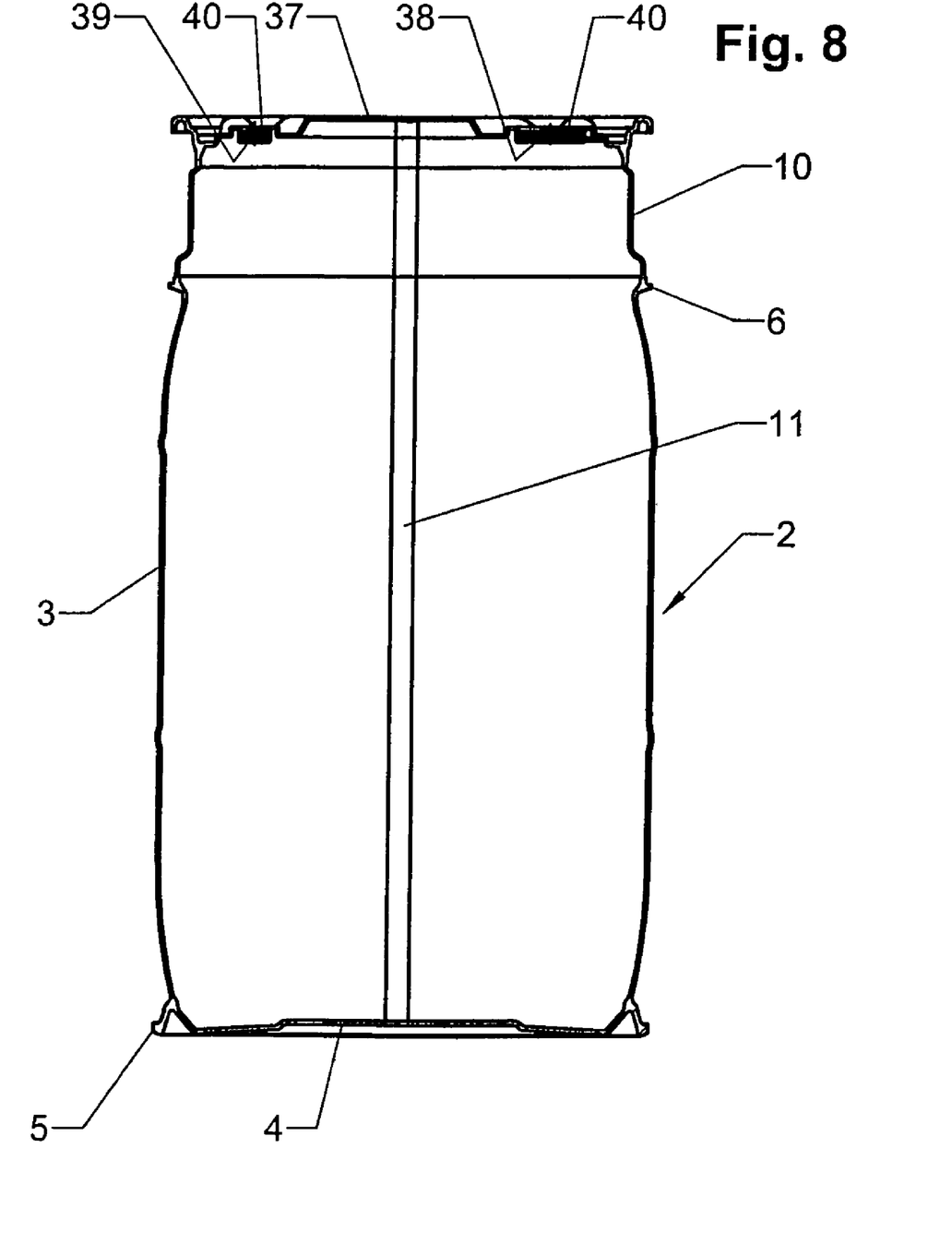
FIG. 8 is a longitudinal section view of a barrel body, removed from a blow mold, provided with support ring and bung lid as well as an intermediate ring for introducing the blow nozzle.
Figure 9:
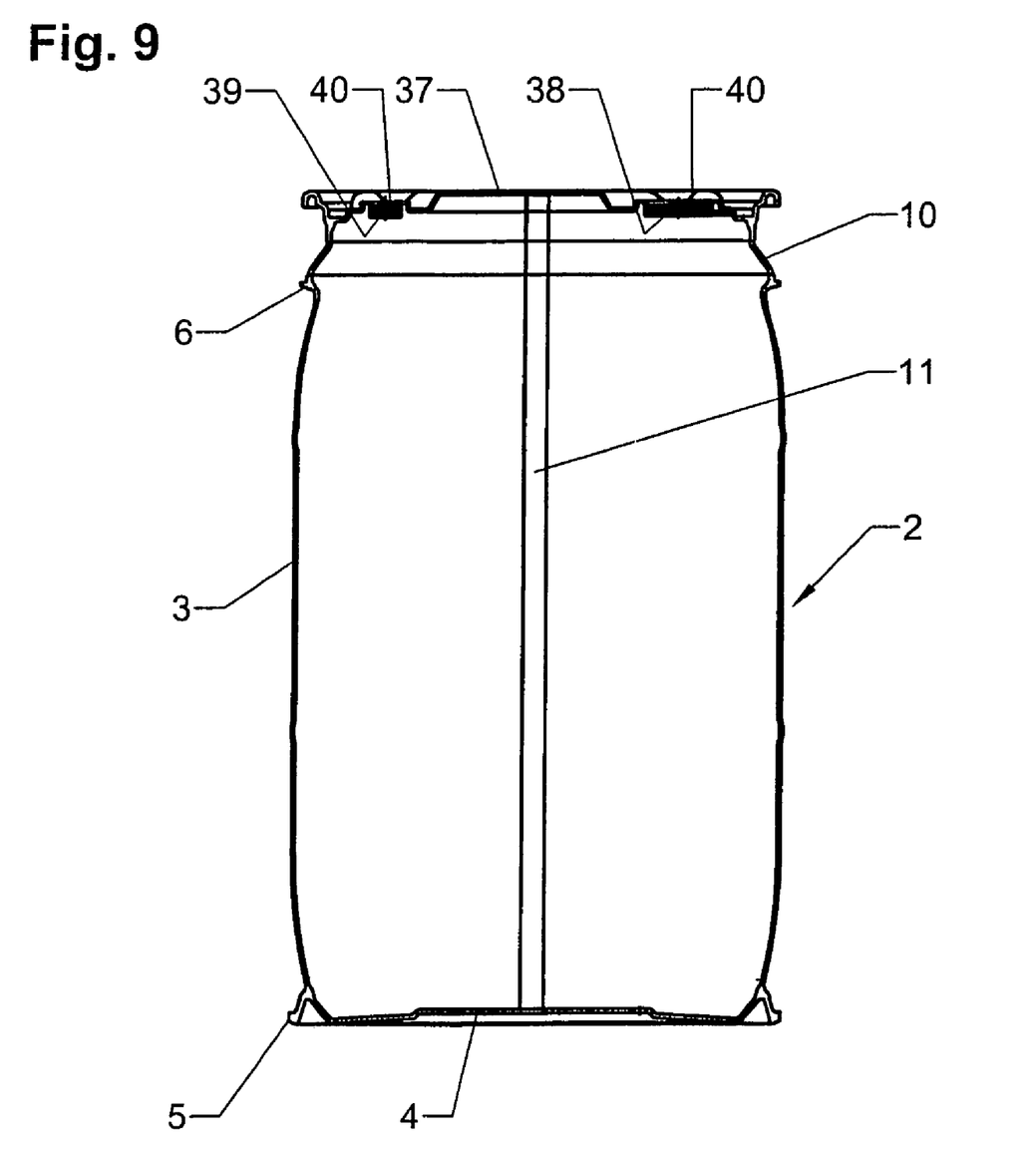
FIG. 9 is a longitudinal section of a barrel body, removed from the blow mold, with support ring and bung lid as well as a narrow intermediate ring wherein the barrel body has been blow-molded by means of a blow nozzle introduced into the bung hole of an airing and venting bung.

Moreover, there is the possibility of producing by means of the described method wide mouth barrels with a bung lid 37 that has a filling and removal bung 38 and an airing and venting bung 39 (FIGS. 8 and 9). When producing wide mouth barrels with a bung lid 37, the blowing air for finish-blowing the closed preform is introduced through the bung hole 40 of one of the two bungs 38, 39 by means of a blow nozzle. Through the blow nozzle(s) 14 inserted into the intermediate ring 10 of the barrel body flushing air can be introduced into the finish-blown barrel body for cooling it in the blow mold 1. When introducing flushing air through one or both bungs 38, 39 of the bung lid 37 of the finish-blown barrel body 2, the inserted blow nozzles in the intermediate ring 10 are no longer required so that the intermediate ring can be designed to be narrower (FIG. 9).

Figure 11:
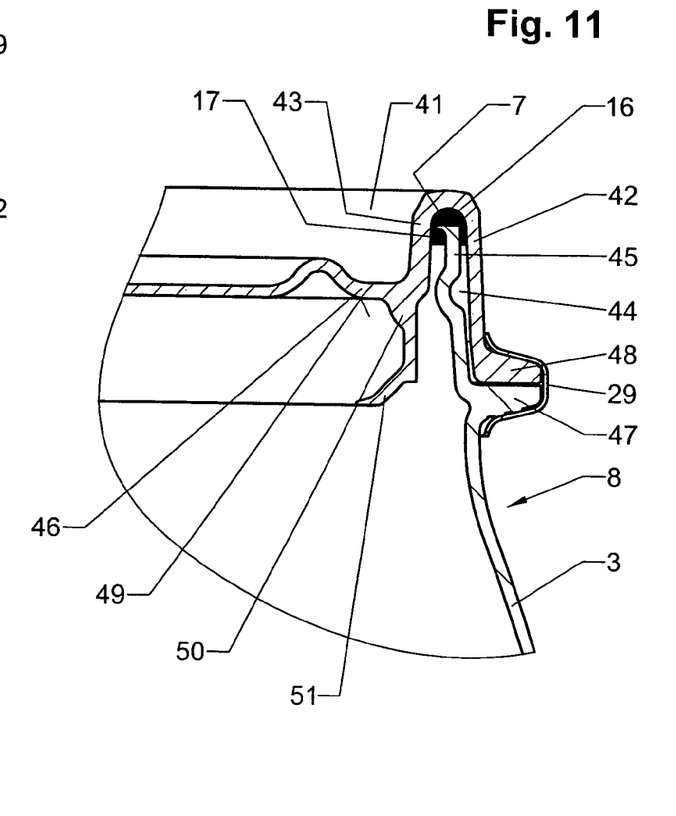
FIG. 11 is a detail view of the lid area of a wide mouth barrel according to FIG. 10.

FIGS. 10 and 11 show a wide mouth barrel 8 produced by the afore described method and having a closed lid or a bung lid 41 that has an outer rim 42 and an inner rim 43 with a downwardly open annular space 44 with a sealing seat 16 for receiving a lid seal or gasket 17. The lid 41 attached to the basic barrel member 3 surrounds with its outer rim 42 the barrel neck 45 and with its inner rim 43 that projects past the lid bottom 46 arranged below the opening rim 7 of the barrel is immersed in the neck 45. The lid 41 is fastened to the basic barrel member 3 by means of a clamping ring 29 that engages a projection 47 formed below the opening rim 7 and an annular flange 48 of the outer rim 42 of the lid 41.

In the corner area between the underside 49 of the lid bottom 46 and the inner rim 43 of the lid 41 a circumferential reinforcement bead 50 is formed and at the lower end of the inner rim 43 of the lid 41 a conical reinforcement ring 51 is arranged.

The afore described method can be used for manufacturing wide mouth barrels that are not electrically grounded in this case, the plastic tube that is extruded in the blow mold and is of a single-layer or multi-layer configuration is not provided with an electrically conducting plastic material.

While specific embodiments of the invention have been shown and described in detail to illustrate the inventive principles, it will be understood that the invention may be embodied otherwise without departing from such principles.

What is claimed is:

1. A method for manufacturing wide mouth barrels from thermoplastic material, wherein the wide mouth barrels have a removable lid and a clamping ring closure, the method comprising the steps of:

extruding a multi-layer plastic tube into a blow mold and producing a closed preform;

finish-blowing the closed preform to a barrel body having a basic barrel member, a bottom with or without support ring, a barrel lid selected from the group consisting of a closed lid or a bung lid, a projection on the basic barrel member for attaching the barrel lid by means of a clamping ring closure, wherein the projection is formed on the basic barrel member at a level of a barrel opening rim or at a spacing below the barrel opening rim of the wide mouth barrel, and an intermediate ring between the projection and the barrel lid or the barrel opening rim and the barrel lid;

introducing blowing air for finish-blowing the closed preform to a barrel body having a closed lid through at least one injection blow nozzle inserted into the intermediate ring and introducing the blowing air for finish-blowing the closed preform to a barrel body with a bung lid through at least one of a bung hole of at least one bung of the bung lid by a blow nozzle and/or through at least one blow nozzle introduced into the intermediate ring;

after cooling of the barrel body in the blow mold and removal of the barrel body from the blow mold, separating the basic barrel member and the barrel lid from one another by cutting out the intermediate ring from the barrel body;

inserting a seal into a sealing seat of the lid; and fastening the lid by the clamping ring on the projection of the basic barrel member, wherein, in the step of extruding, a multi-layer tube of a non-conducting basic material is co extruded together with at least one section arranged on the circumference of the tube, wherein the section is a contact strip of an electrically conducting plastic material, wherein the preform is finish-blown to an electrically grounded barrel body with at least one electrically conducting contact strip integrated into the barrel lid, the intermediate ring, the basic barrel member, and the barrel bottom, wherein the contact strip provides an electrical connection between the inner surface and the outer surface of the barrel body and has a thickness that matches a wall thickness of the barrel body.

2. The method according to claim 1, wherein, in the step of extruding, the multi-layer tube is extruded continuously or discontinuously and is split at least at one location on the circumference to form a gap and the electrically conducting plastic material is injected into the gap and fuses homogeneously to the non-conducting basic material of the tube to form the contact strip.

3. The method according to claim 2, wherein the tube comprises an inner layer and a conducting or permanently antistatic outer layer.

4. The method according to claim 2, wherein the tube comprises an inner layer, a central layer, and a conducting or permanently antistatic outer layer.

5. The method according to claim 4, wherein the tube further comprises a barrier layer arranged between the inner layer and the central layer, wherein the barrier layer is embedded in two bonding layers.

6. The method according to claim 1, further comprising, after the step of separating, the steps of exposing edges of cut produced on the barrel lid and the basic barrel member by cutting out the intermediate ring to hot air for removing burrs and subsequently passing the barrel lid and the basic barrel member through a cooling stretch.

7. The method according to claim 1, wherein, in the step of finish-blowing, the barrel lid is formed with a downwardly open U-shaped outer rim providing the sealing seat for receiving the seal, wherein the outer ring with the sealing seat is pressed by oppositely moving mold slides and cooling of the outer rim inwardly and outwardly by the mold slides.

8. The method according to claim 7, wherein, in the step of finish-blowing, a circumferential reinforcement bead for reinforcing the barrel lid is formed between an engagement groove adjoining the outer rim and provided for a barrel gripping device and an annular stay formed below the engagement groove.

* * * * *